UNITED STATES PATENT OFFICE.

JOHN H. ZUMSTEIN, OF NEW YORK, N. Y.

IMPROVEMENT IN MEAT AND VEGETABLE SAUSAGES.

Specification forming part of Letters Patent No. 116,389, dated June 27, 1871.

*To all whom it may concern:*

Be it known that I, JOHN H. ZUMSTEIN, of the city, county, and State of New York, have invented a new and useful Improvement in Meat and Vegetable Sausage; and I do hereby declare that the following is a full, clear, and exact decription thereof, which will enable others skilled in the art to make and use the same.

My invention has for its object to furnish a meat and vegetable sausage which shall be so prepared that it will keep for a long time—from four to six years in any climate—and shall contain a large amount of nutriment in small compass, thus adapting it for the use of sailors, soldiers, and others who are required to carry or keep their provisions with them; and it consists of the sausage prepared of the ingredients, in the proportions, and in the manner hereinafter more fully described.

In preparing this sausage I use the following ingredients in the following proportions: Ten pounds of smoked beef, ham, or other meat; twenty pounds of bacon; twenty pounds of ox-fat; seven pounds of salt; three pounds of onions; twenty-five pounds of raw and fifteen pounds of roasted yellow pea-flour, beans, Indian meal, barley, or other cereal; two and a half ounces of pepper; half an ounce of nutmeg; half an ounce of cloves; two and a half ounces of allspice; one-quarter of an ounce of the nitrate of potassa; three-eighths of an ounce of phosphate of soda, and one-eighth of an ounce of borax.

The bacon and other meats are boiled about twenty minutes and cut into very small cubes or pieces. The ox-fat is melted over a slow fire and made hot, but should not be heated to the boiling point. The spices are then mixed with the hot fat, then the preservatives, and then the salt. The mixture is then thickened with the roasted meal to the consistency of thin pap. The bacon is then put in, and afterward the other meat, and the mixture is thoroughly stirred over a slow fire. The balance of the roasted meal is then added, and the mass is thickened with the raw meal while being constantly stirred. The mass, while still burning hot, is filled into cleanly-prepared guts, parchment, paper, or tin-foil, either by machinery or by a syringe prepared for the purpose, and is strung off into sections of about one-third of a pound each. The sausages are then put into hot water for a few minutes to cleanse them, are laid each string separately, so that they may not touch each other, upon dry wooden or marble tables or shelvings, and in half an hour's time the compound will become firm and hard.

Having thus described my invention, I claim as new and desire to secure by Letters Patent—

An improved meat and vegetable sausage prepared of the ingredients, in the proportions, and in the manner substantially as herein set forth and described.

The above specification of my invention signed by me this 18th day of April, 1871.

JOHN H. ZUMSTEIN.

Witnesses:
JAMES T. GRAHAM,
T. B. MOSHER.